US008614958B2

(12) United States Patent
Unger et al.

(10) Patent No.: US 8,614,958 B2
(45) Date of Patent: Dec. 24, 2013

(54) SYSTEMS AND METHODS OF SNOOPING CONNECTIVITY FAULT MESSAGES TO CONFIGURE MAINTENANCE END POINT FOR ALARM SUPPRESSION MESSAGES

(75) Inventors: Stephen John Unger, Allen, TX (US); David Joseph Haas, Mahwah, NJ (US)

(73) Assignee: Fujitsu Limited, Kawasaki-shi (JP)

( * ) Notice: Subject to any disclaimer, the term of this patent is extended or adjusted under 35 U.S.C. 154(b) by 721 days.

(21) Appl. No.: 12/836,162

(22) Filed: Jul. 14, 2010

(65) Prior Publication Data
US 2012/0014263 A1    Jan. 19, 2012

(51) Int. Cl.
| G01R 31/08 | (2006.01) |
| G06F 11/00 | (2006.01) |
| G08C 15/00 | (2006.01) |
| H04J 1/16  | (2006.01) |
| H04J 3/14  | (2006.01) |
| H04L 1/00  | (2006.01) |
| H04L 12/28 | (2006.01) |

(52) U.S. Cl.
USPC ......... 370/248; 370/241; 370/241.1; 370/242

(58) Field of Classification Search
None
See application file for complete search history.

(56) References Cited

U.S. PATENT DOCUMENTS

| 2008/0016402 A1* | 1/2008 | Harel et al. ............... 714/43 |
| 2010/0211192 A1* | 8/2010 | Stluka et al. ............. 700/12 |
| 2011/0194564 A1* | 8/2011 | Gupta et al. ............ 370/395.53 |
| 2012/0042069 A1* | 2/2012 | Hatasaki et al. ........... 709/224 |

* cited by examiner

*Primary Examiner* — Anez Ebrahim
(74) *Attorney, Agent, or Firm* — Baker Botts L.L.P.

(57) ABSTRACT

According to one embodiment, a method may include a given maintenance end point receiving connectivity fault management (CFM) messages (e.g., CCMs) at the provisioned maintenance level of the maintenance end point. Additionally the method may also include snooping CFM messages at maintenance levels higher the provisioned maintenance level of the given maintenance end point and storing the configuration information necessary for transmitting alarm indication suppression message from the lowest higher-level CFM message snooped across the maintenance end point. The method may further include a timeout of the stored information if transmission of the higher-level CFM messages cease. The method may include snooping these higher-level CFM messages in either direction and also include the ability to display the higher-level CFM information to an operator through a user-interface.

20 Claims, 5 Drawing Sheets

US 8,614,958 B2

SYSTEMS AND METHODS OF SNOOPING CONNECTIVITY FAULT MESSAGES TO CONFIGURE MAINTENANCE END POINT FOR ALARM SUPPRESSION MESSAGES

TECHNICAL FIELD

This invention relates generally to the field of communications systems and more specifically to configuring a maintenance end point for transmission of alarm indication suppression messages.

BACKGROUND

A communication network may include network elements that route packets through the network. Some network elements may include a distributed architecture, wherein packet processing may be distributed among several subsystems of the network element (e.g., line cards).

Service Operation, Administration, and Management ("Service OAM" or "SOAM"), is defined by IEEE 802.1ag and defines Maintenance Entity Group End Points (MEPs) that may be provisioned on a network element. A MEP may be associated with a particular maintenance level (e.g., 0 to 7) and may be configured to communicate management traffic, for example continuity check messages (CCMs), to a peer MEP at the same maintenance level that resides in the communication network. CCMs may be periodically communicated between MEPs at the same maintenance level, and a service is considered down if a MEP does not receive a CCM from its peer MEP within a certain time.

The ITU Y.1731 standard complements IEEE 802.1ag by allowing a MEP to transmit a Ethernet Alarm Indication Suppression (Eth-AIS) messages in a network direction away from where its peer MEP is located (e.g., in an upstream direction). Such Eth-AIS messages allow for alarms to be suppressed when received by a MEP. Traditionally, Eth-AIS messages can be communicated from a source MEP to a higher maintenance level MEP upstream of the source MEP if the source MEP has been provisioned with information regarding the higher maintenance level MEP (e.g., a Media Access Control (MAC) address or other unique identifier for the higher maintenance level MEP). However, such provisioning is typically performed manually, leading to configuration complexity for an administrator of the communication network.

SUMMARY OF THE DISCLOSURE

In accordance with the present invention, disadvantages and problems associated with configuration of a maintenance end point for transmission of alarm indication suppression messages may be reduced or eliminated.

According to one embodiment, a method may include a given maintenance end point receiving connectivity fault management (CFM) messages (e.g., CCMs) at the provisioned maintenance level of the maintenance end point. Additionally the method may also include snooping CFM messages at maintenance levels higher the provisioned maintenance level of the given maintenance end point and storing the configuration information necessary for transmitting alarm indication suppression message from the lowest higher-level CFM message snooped across the maintenance end point. The method may further include a timeout of the stored information if transmission of the higher-level CFM messages cease. The method may include snooping these higher-level CFM messages in either direction and also include the ability to display the higher-level CFM information to an operator through a user-interface.

According to another embodiment, a method may include receiving a connectivity fault management message at a first maintenance end point from a second maintenance end point. The method may further include determining from the connectivity fault management message if the second maintenance end point is of a higher maintenance level than the level of the first maintenance end point. Additionally, the method may include determining from the connectivity fault management message if the second maintenance end point is of a lower maintenance level than a presently stored snoop level variable, the presently stored snoop level variable indicative of a maintenance level of the lowest maintenance level maintenance end point from which the first management end point has received a previous connectivity fault management message. The method may also include, in response to determining that the second maintenance end point is of a higher maintenance level than the first maintenance end point and determining that the second maintenance end point is of a lower maintenance level than a presently stored snoop level variable: (i) storing the maintenance level of the second maintenance end point as the snoop level variable; and (ii) storing configuration information for transmission of alarm indication suppression messages from the first maintenance end point to a destination maintenance end point of the connectivity fault management message.

Certain embodiments of the invention may provide one or more technical advantages. A technical advantage may be that configuration for transmission of alarm indication suppression messages may take place automatically without the need for human-initiated alarm indication suppression message provisioning.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1-5, like numerals being used for like and corresponding parts of the various drawings.

Figure 1:
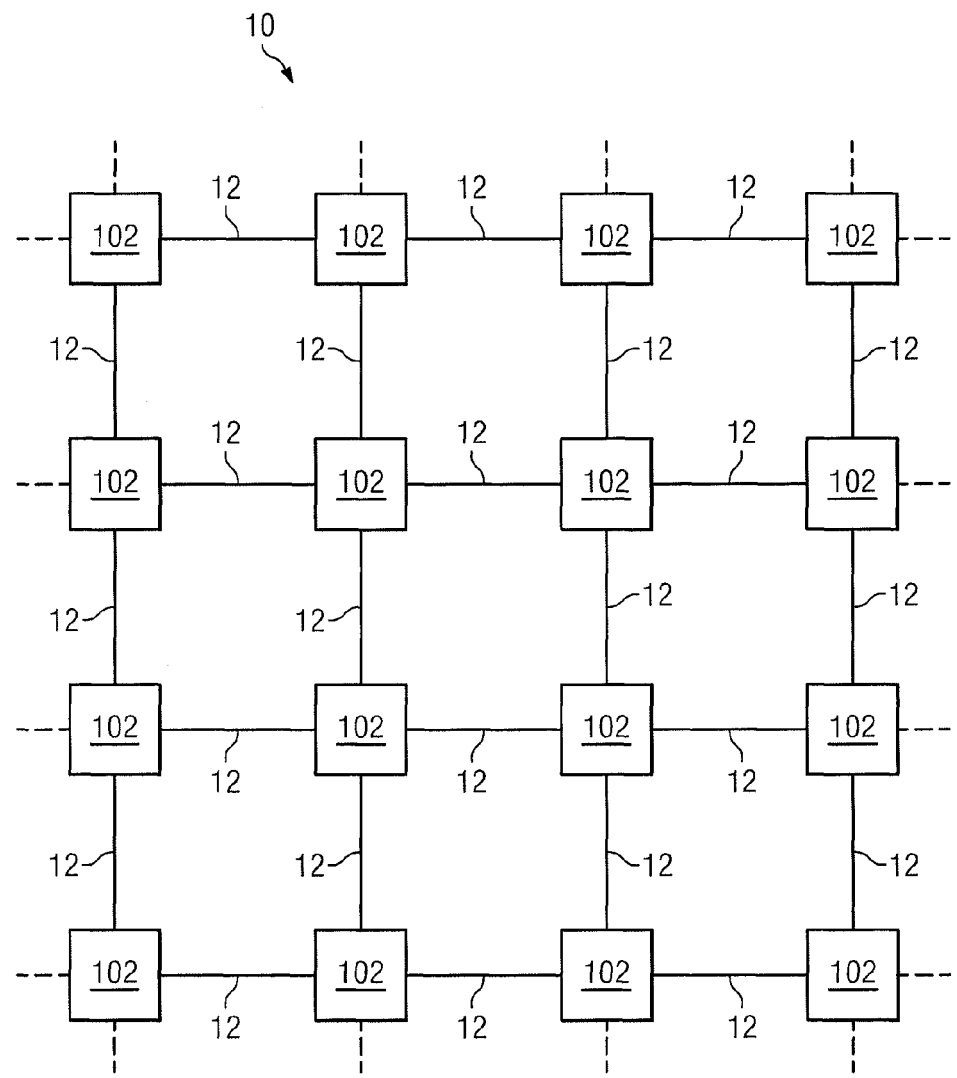
FIG. 1 illustrates a block diagram of an example communication network, in accordance with certain embodiments of the present disclosure.

FIG. 1 illustrates a block diagram of an example network 10, in accordance with certain embodiments of the present disclosure. In certain embodiments, network 10 may be an Ethernet network. Network 10 may include one or more transmission media 12 operable to transport one or more signals communicated by components of network 10. The components of network 10, coupled together by transmission media 12, may include a plurality of network elements 102. In the illustrated network 10, each network element 102 is coupled to four other nodes. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

Figure 2:
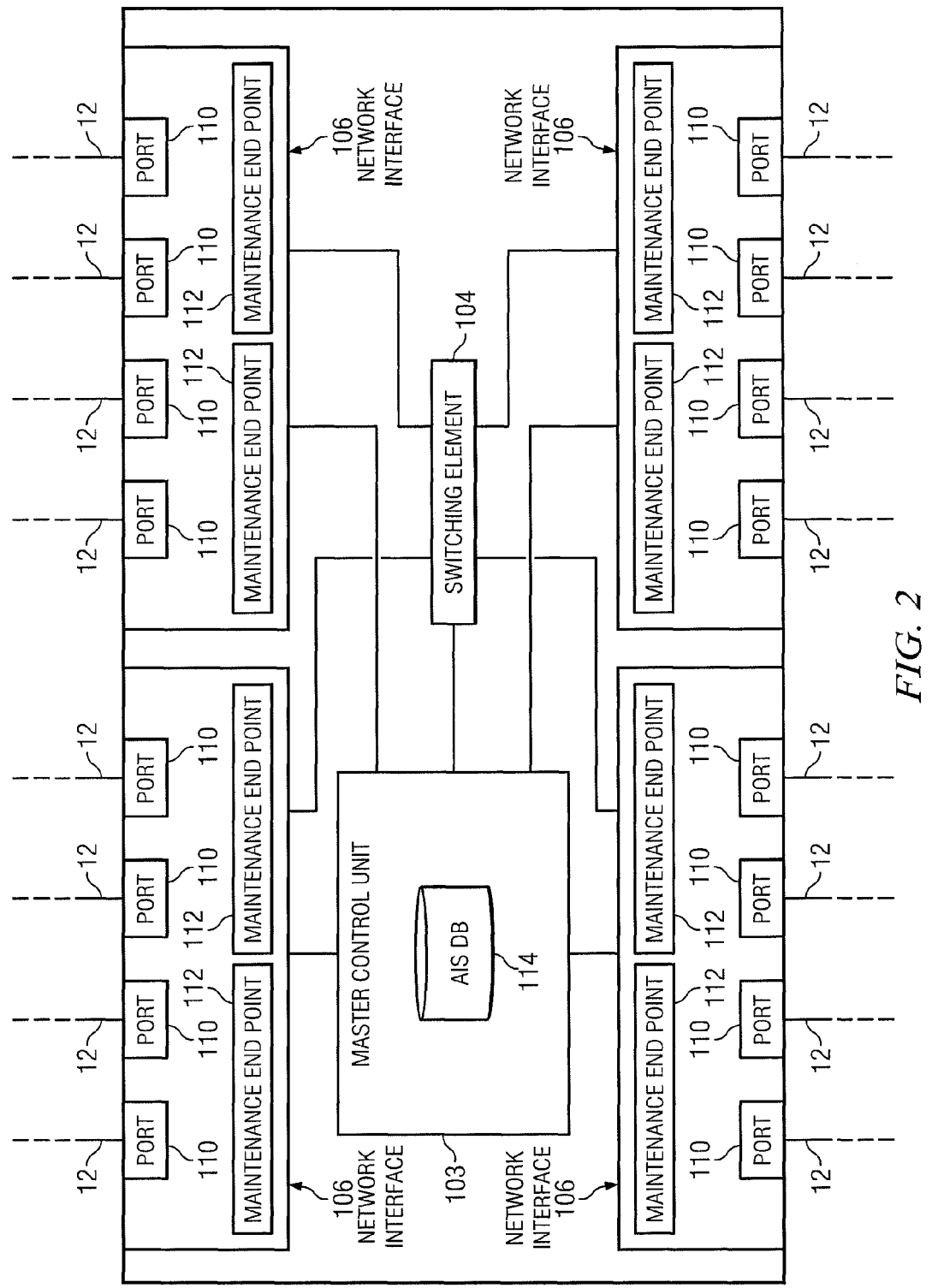
FIG. 2 illustrates a block diagram an example network element, in accordance with certain embodiments of the present disclosure.

FIG. 2 illustrates a block diagram an example network element 102, in accordance with certain embodiments of the present disclosure. As discussed above, each network element 102 may be coupled to one or more other network elements 102 via one or more transmission media 12. Each network element 102 may generally be configured to receive data from and/or transmit data to one or more other network elements 102. In certain embodiments, network element 102 may comprise a switch configured to route data received by network element 102 to another device (e.g., another network element 102) coupled to network element 102.

As depicted in FIG. 2, each network element 102 may include a master control unit 103, a switching element 104, and one or more network interfaces 106 communicatively coupled to each of master control unit 103 and switching element 104.

Master control unit 103 may include any suitable system, apparatus, or device configured to manage network element 102, including management of routing of data between ports 110. Master control unit 103 may maintain a routing table in accordance with open shortest path first (OSPF) protocol, intermediate system-intermediate system (ISIS) protocol, or any other suitable protocol, wherein such routing table may include any table, database, file, or other data structure configured to maintain information relating a particular ingress port 110 to a corresponding egress port 110.

As shown in FIG. 2, master control unit 103 may include alarm indication suppression (AIS) database 114. AIS database 114 may be stored in memory and/or other computer readable media, and may include a file, map, list, database, table, or other suitable data structure configured to store configuration information required by a maintenance end point 112 to support transmission of alarm indication suppression messages.

Switching element 104 may be communicatively coupled to master control unit 103 and may include any suitable system, apparatus, or device configured to receive traffic via a port 110 and route such traffic to a particular network interface 106 and/or port 110 based on analyzing the contents of the data and/or based on a characteristic of a signal carrying the data (e.g., a wavelength and/or modulation of the signal). For example, in certain embodiments, a switching element 104 may include a switch fabric (SWF).

Each network interface 106 may include any suitable system, apparatus, or device configured to serve as an interface between a network element 102 and a transmission medium 12. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card.

As depicted in FIG. 2, each of network interfaces 106 may include one or more physical ports 110. Each physical port 110 may include any system, device or apparatus configured to serve as a physical interface between a corresponding transmission medium 12 and network interface 106. For example, a physical port 110 may comprise an Ethernet port, an optical port, or any other suitable port.

Also as shown in FIG. 2, each network interface 106 may have one or more maintenance end points 112 provisioned thereon. A maintenance end point 112 may include an end point of a group of network components associated with a particular maintenance level and may be configured to communicate management traffic, for example connectivity fault management (CFM) messages, to a peer maintenance end point 112 of the same maintenance level, as described in greater detail below. Such CFM messages may include heartbeat or hello messages (e.g., CCMs), loopback messages, linktrace messages, and alarm indication suppression messages. In certain embodiments, a maintenance end point 112 may include a Maintenance Entity Group End Point (MEP) in accordance with a SOAM standard (e.g., IEEE 802.1ag). Although network element 102 is depicted in FIG. 2 as having a particular number of maintenance end points 112, network element 102 may include any suitable number of maintenance end points 112. In some embodiments, network element 102 may include a plurality of maintenance end points 112 wherein at least two of such maintenance end points 112 are of a different maintenance level.

In addition, a maintenance end point may be configured to transmit alarm indication suppression messages (e.g., Eth-AIS messages) in a network direction away from where its peer maintenance end point 112 is located (e.g., in an upstream direction). As described in greater detail below, a maintenance end point 112 may be configured to transmit alarm indication suppression based on information received by snooping connectivity fault management messages communicated by higher maintenance level maintenance end points 112.

Figure 3:
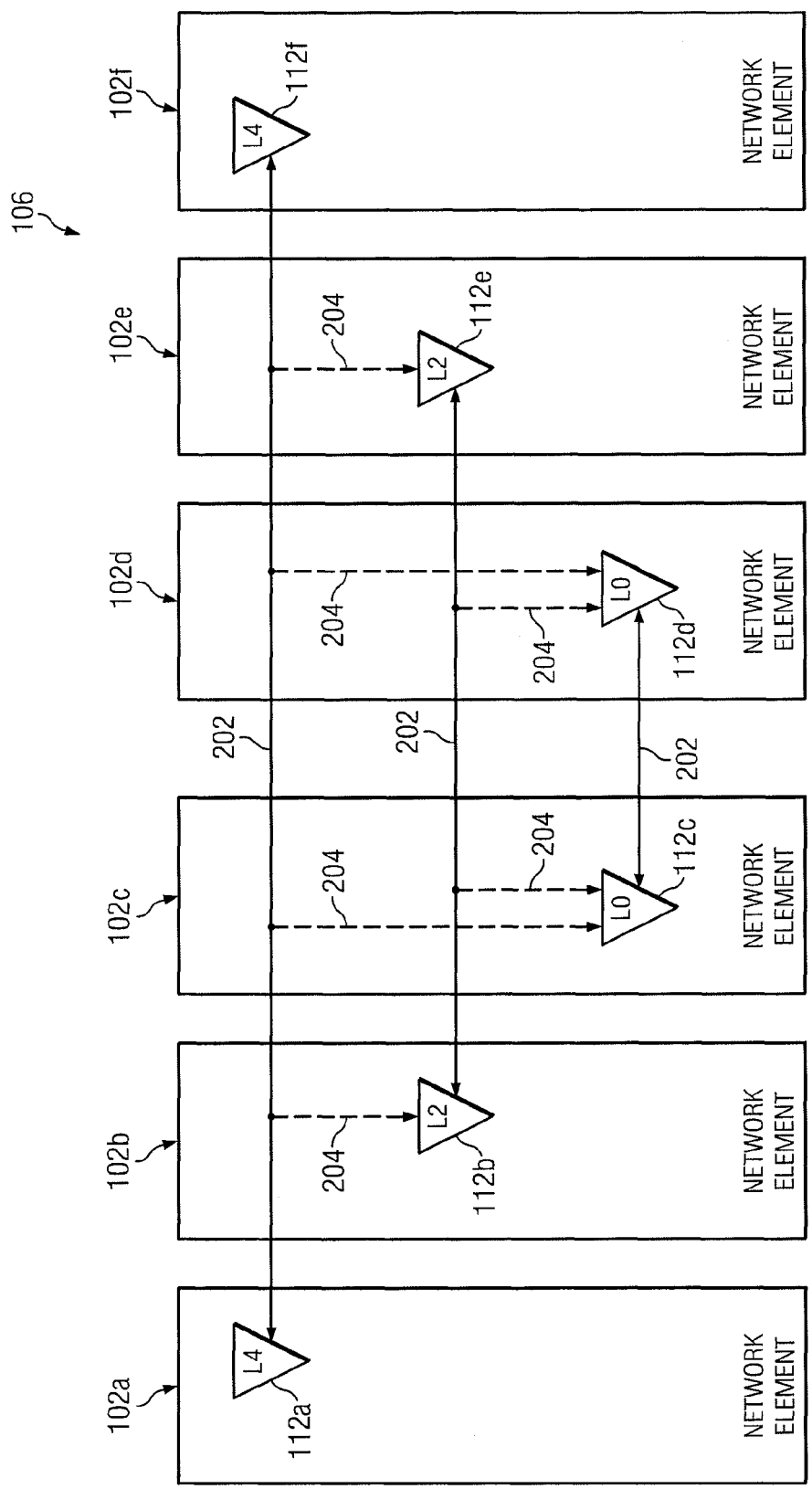
FIG. 3 illustrates a block diagram of an example network for which connectivity fault management message snooping may be used to configure a maintenance end point for transmission of alarm suppression messages, in accordance with certain embodiments of the present disclosure.

FIG. 3 illustrates a block diagram of an example network 10b for which connectivity fault management message snooping may be used to configure a maintenance end point 112 for transmission of alarm suppression messages, in accordance with certain embodiments of the present disclosure. Network 10b is depicted as including a plurality of network elements 102 (e.g., network elements 102a-f) each with a maintenance end point 112 (e.g., maintenance end points 112a-f) provisioned thereon. Network 10b may be similar to network 10 depicted in FIG. 1, and network elements 102a-102f may be similar to example network element 102 depicted in FIG. 2. However, for the purposes of exposition, FIG. 3 is shown with less detail than FIGS. 1 and 2. As shown in the example network 10b of FIG. 3, maintenance end points 112a and 112f may be peer maintenance end points on maintenance level 4, maintenance end points 112b and 112e may be peer maintenance end points on maintenance level 2, and maintenance end points 112c and 112d may be peer maintenance end points on maintenance level 0. Peer maintenance end points 112 may communicate connectivity fault management messages 202 (e.g., CCMs) to each other at defined intervals. In operation, each maintenance end point 112 may be configured to analyze connectivity fault management messages 202 for maintenance end points 112 non-local to the network element 102 including the maintenance end point 112. Such analysis may enable maintenance end points 112 to "snoop" connectivity fault management messages of higher maintenance level maintenance end points 112, as indicated by dotted arrows 204. Such snooping may permit maintenance end points 112 to be configured for transmission of alarm indication suppression messages to such higher level maintenance level maintenance end points, as described in greater detail below.

Figure 4:
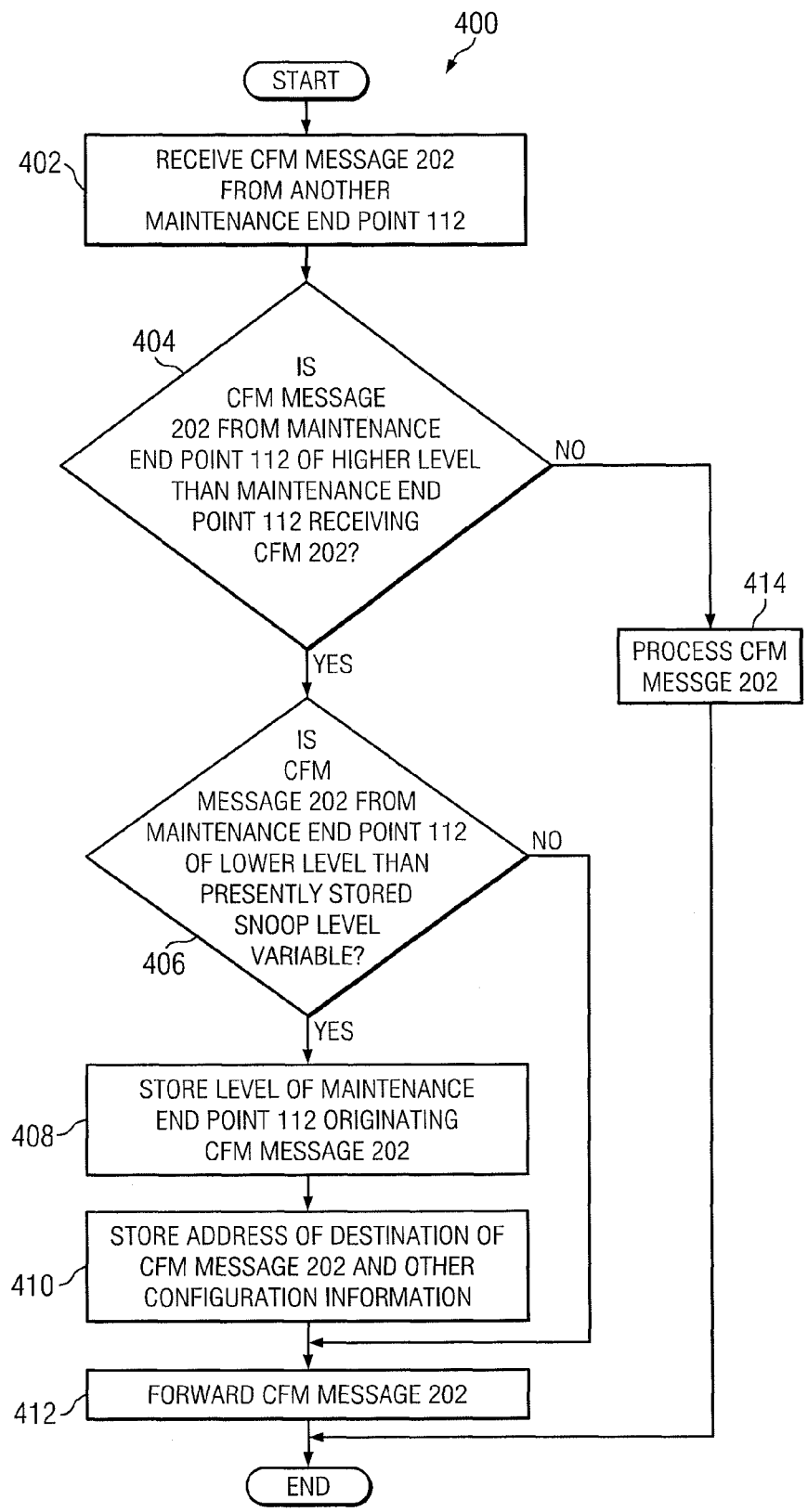
FIG. 4 illustrates a flow chart of an example method for configuring a maintenance end point for transmission of alarm suppression messages using connectivity fault management message snooping, in accordance with certain embodiments of the present disclaimer.

FIG. 4 illustrates a flow chart of an example method 400 for configuring a maintenance end point for transmission of alarm suppression messages using connectivity fault management message snooping. According to one embodiment, method 400 may begin at step 402. As noted above, teachings of the present disclosure may be implemented in a variety of configurations of networks 10 and 10b. As such, the preferred initialization point for method 400 and the order of the steps 402-414 comprising method 400 may depend on the implementation chosen.

At step 402, a first maintenance end point 112 on a first network element 102 may receive a connectivity fault management message 202 (e.g., a CCM) from a second maintenance end point 112.

At step 404, first maintenance end point 112 may determine if the second maintenance end point 112 is of a higher maintenance level than the first maintenance end point 112. If the second maintenance end point 112 is of a higher maintenance level than the first maintenance end point 112, method 400 may proceed to step 406. Otherwise, method 400 may proceed to step 414.

At step 406, first maintenance end point 112 may determine if the second maintenance end point 112 is of a lower maintenance level than a presently stored snoop level variable, wherein the presently stored snoop level variable may be indicative of the maintenance level of the lowest maintenance level maintenance end point 112 from which first network element 102 has received a connectivity fault management message 202. The snoop level variable may be stored in alarm indication suppression database 114 and/or another suitable memory. In some embodiments, the snoop level variable may be initialized to a dummy value indicating that first network element 102 has not received a connectivity fault management message during its operation from a maintenance end point 112 of higher maintenance level than the highest maintenance level maintenance end point 112 instantiated on first network element 102. Such dummy value may have a value larger than the value indicative of the highest maintenance level, thus allowing the test set forth in step 406 to be "true" the first time that a maintenance end point 112 of first network element 102 receives a connectivity fault management message 202. If the second maintenance end point 112 if of a lower maintenance level than a presently stored snoop level variable, method 400 may proceed to step 408. Otherwise, method 400 may proceed to step 412.

At step 408, first maintenance end point 112 or another component of first network element 112 may store the maintenance level of the second maintenance end point 112 as the snoop level variable (e.g., to be stored in alarm indication suppression database 114 and/or other suitable memory.

At step 410, first maintenance end point 112 may store the address (e.g., Media Access Control (MAC) address) of the destination of connectivity fault management message 202 (e.g., the peer of second maintenance end point 112) and/or other configuration information to permit first maintenance end point 112 to transmit alarm indication suppression messages (e.g., Eth-AIS messages) to such destination maintenance end point 112.

At step 412, first maintenance end point 112 may forward connectivity fault management message 202 pursuant to routing information included within connectivity fault management message 202. After completion of step 412, method 400 may end.

At step 414, in response to a determination that the second maintenance end point 112 is not of a higher maintenance level than the first maintenance end point 112, the first maintenance end point 112 may process connectivity fault management message 202. After completion of step 414, method 400 may end.

FIG. 4 illustrates a flow chart of an example method 400 for configuring a maintenance end point for transmission of alarm suppression messages using connectivity fault management message snooping. According to one embodiment, method 400 may begin at step 402. As noted above, teachings of the present disclosure may be implemented in a variety of configurations of networks 10 and 10b. As such, the preferred initialization point for method 400 and the order of the steps 402-414 comprising method 400 may depend on the implementation chosen.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using network 10, network 10b, or any other system operable to implement method 400. In certain embodiments, method 400 may be implemented partially or fully in software and/or firmware embodied in memory.

As a result of the steps of method 400, maintenance end points 112 of a network element 102 may automatically configure themselves for transmission of alarm indication suppression messages to higher level upstream maintenance end points, without the necessity of human provisioning.

Figure 5:
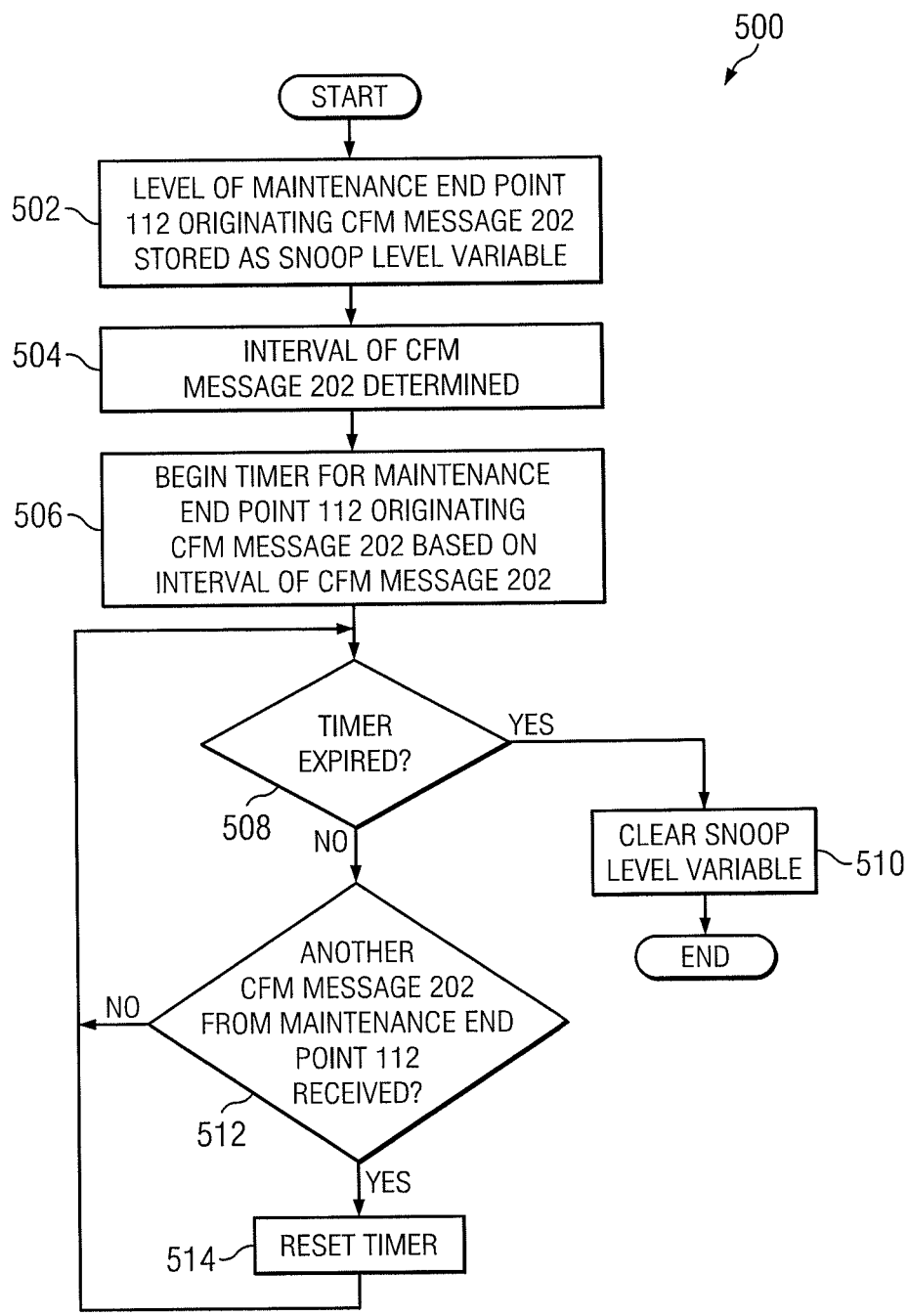
FIG. 5 illustrates a flow chart of an example method for storing a snoop level variable, in accordance with certain embodiments of the present disclosure.

FIG. 5 illustrates a flow chart of an example method 500 for storing a snoop level variable. According to one embodiment, method 500 may begin at step 502. As noted above, teachings of the present disclosure may be implemented in a variety of configurations of networks 10 and 10b. As such, the preferred initialization point for method 500 and the order of the steps 502-514 comprising method 500 may depend on the implementation chosen.

At step 502, a level of a maintenance end point 212 originating a connectivity fault management message 202 may be stored as a snoop level variable (e.g., such as in step 408 of FIG. 4, for example).

At step 504, an interval of the connectivity fault management message 202 may be stored by the maintenance end point 212 receiving the message. The interval may be a time period after which the connectivity fault management message 202 is repeated.

At step 506, the maintenance end point 202 receiving the connectivity fault management message 202 may begin a timer, wherein the length of such timer is based on the interval of the connectivity fault management message 202. For example, in some embodiments, the length of the timer may be a multiple of the interval (e.g., 2.5 times the interval). Expiration of the timer may indicate that the originating maintenance end point 112 is no longer present or no longer has connectivity to the receiving maintenance end point 112.

At step 508, the receiving maintenance end point 112 may determine if the timer has expired. If the timer has expired, method 500 may proceed to step 510. Otherwise, method 500 may proceed to step 512.

At step 510, in response to determining that the timer has expired, receiving maintenance end point 112 may clear the snoop level variable. After completion of step 510, method 500 may end.

At step 512, in response to determining that the timer has not expired, receiving maintenance end point 112 may determine if another connectivity fault management message 202 has been originated by the originating maintenance end point 112 and received by the receiving maintenance end point 112. If another connectivity fault management message 202 has been received from the originating maintenance end point 112, method 500 may proceed to step 514. Otherwise, method 500 may proceed again to step 508.

At step 514, in response to determining that another connectivity fault management message 202 has been received from the originating maintenance end point 112, receiving maintenance end point 112 may reset the timer. After completion of step 514, method 500 may proceed again to step 508.

Although FIG. 5 discloses a particular number of steps to be taken with respect to method 500, method 500 may be executed with greater or lesser steps than those depicted in FIG. 5. In addition, although FIG. 5 discloses a certain order of steps to be taken with respect to method 500, the steps comprising method 500 may be completed in any suitable order.

Method 500 may be implemented using network 10, network 10b, or any other system operable to implement method 500. In certain embodiments, method 500 may be implemented partially or fully in software and/or firmware embodied in memory.

A component of network 10 or 10b may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), application specific integrated circuit (ASIC), field-programmable gate array (FPGA), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 and 10b without departing from the scope of the invention. The components of network 10 and 10b may be integrated or separated. Moreover, the operations of network 10 and 10b may be performed by more, fewer, or other components. Additionally, operations of network 10 and 10b may be performed using any suitable logic. As used in this document, "each" refers to each member of a set or each member of a subset of a set.

Certain embodiments of the invention may provide one or more technical advantages. A technical advantage of one embodiment may be that alarm indication signals that typically originate from maintenance end points may be transmitted in the event that equipment upon which the maintenance end points have experienced a fault, thus reducing the occurrence of unnecessary alarms.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:
1. A method comprising:
receiving a connectivity fault management message at a first maintenance end point from a second maintenance end point, wherein the first and second maintenance end points are Service Operation, Administration, and Management ("SOAM") maintenance end points;

determining from the connectivity fault management message if the second maintenance end point is of a higher SOAM maintenance level than the first maintenance end point;

determining from the connectivity fault management message if the second maintenance end point is of a lower SOAM maintenance level than a presently stored snoop level variable, the presently stored snoop level variable indicative of a SOAM maintenance level of the lowest SOAM maintenance level maintenance end point from which the first management end point has received a previous connectivity fault management message;

in response to determining that the second maintenance end point is of a higher SOAM maintenance level than the first maintenance end point and determining that the second maintenance end point is of a lower SOAM maintenance level than a presently stored snoop level variable:

storing the SOAM maintenance level of the second maintenance end point as the snoop level variable; and storing configuration information for transmission of alarm indication suppression messages from the first maintenance end point to a destination maintenance end point of the connectivity fault management message.

2. A method according to claim 1, further comprising forwarding the connectivity fault management message pursuant to routing information included within the connectivity fault management message.

3. A method according to claim 1, further comprising:

determining whether the first maintenance end point has received a previous connectivity fault management message from a maintenance end point other than the first maintenance end point that is of a higher SOAM maintenance level than the first maintenance end point; and in response to determining that the first maintenance end point has not received a previous connectivity fault management message from a maintenance end point other than the first maintenance end point that is of a higher SOAM maintenance level than the highest SOAM maintenance level of the first maintenance end point:

storing the SOAM maintenance level of the second maintenance end point as the snoop level variable; and storing configuration information for transmission of alarm indication suppression messages from the first maintenance end point to a destination maintenance end point of the connectivity fault management message.

4. A method according to claim 3, wherein determining whether the first maintenance end point has received a previous connectivity fault management message from a maintenance end point other than the first maintenance end point comprises determining whether the presently stored snoop level variable is a variable indicative that first maintenance end point has not received a previous connectivity fault management message from a maintenance end point other than the first maintenance end point.

5. A method according to claim 1, wherein the connectivity fault management message is a continuity check message in accordance with IEEE 802.1ag.

6. A method according to claim 1, wherein each of the first maintenance end point and the second maintenance end point is a Maintenance Entity Group End Point in accordance with IEEE 802.1ag.

7. A method according to claim 1, wherein the alarm indication suppression messages comprise Eth-AIS messages in accordance with ITU Y.1731.

8. A network element comprising:
a first maintenance end point; and
a memory having stored thereon configuration information for transmission of alarm indication suppression messages from the first maintenance end points to other maintenance end point;

wherein the first maintenance end point is configured to:

receive a connectivity fault management message from a second maintenance end point, wherein the first and second maintenance end points are Service Operation, Administration, and Management ("SOAM") maintenance end points;

determine if the second maintenance end point is of a higher SOAM maintenance level than the first maintenance end point;

determine if the second maintenance end point is of a lower SOAM maintenance level than a presently stored snoop level variable stored on the memory, the presently stored snoop level variable indicative of a SOAM maintenance level of the lowest SOAM maintenance level maintenance end point from which first maintenance end point has received a previous connectivity fault management message;

in response to determining that the second maintenance end point is of a higher SOAM maintenance level than the first maintenance end point and determining that the second maintenance end point is of a lower SOAM maintenance level than a presently stored snoop level variable:

store the SOAM maintenance level of the second maintenance end point as the snoop level variable; and store configuration information for transmission of alarm indication suppression messages from the first maintenance end point to a destination maintenance end point of the connectivity fault management message.

9. A network element according to claim 8, the first maintenance end point further configured to forward the connectivity fault management message pursuant to routing information included within the connectivity fault management message.

10. A network element according to claim 8, the first maintenance end point further configured to:

determine whether the first maintenance end point has received a previous connectivity fault management message from a maintenance end point other than the first maintenance end point that is of a higher SOAM maintenance level than the first maintenance end point; and in response to determining that the first network element has not received a previous connectivity fault management message from a maintenance end point other the first network element that is of a higher SOAM maintenance level than the first maintenance end point:

store the SOAM maintenance level of the second maintenance end point as the snoop level variable; and store configuration information for transmission of alarm indication suppression messages from the first maintenance end point to a destination maintenance end point of the connectivity fault management message.

11. A network element according to claim 10, the first maintenance end point configured to determine whether the first maintenance end point has received a previous connectivity fault management message from a maintenance end point other than first maintenance end point that is of a higher SOAM maintenance level than the first maintenance end point by determining whether the presently stored snoop level variable is a variable indicative that the first maintenance end point has not received a previous connectivity fault management message from a maintenance end point other than the first maintenance end point that is of a higher SOAM maintenance level than the first maintenance end point.

12. A network element according to claim 8, wherein the connectivity fault management message is a continuity check message in accordance with IEEE 802.1ag.

13. A network element according to claim 8, wherein each of the first maintenance end point and the second maintenance end point is a Maintenance Entity Group End Point in accordance with IEEE 802.1ag.

14. A network element according to claim 8, wherein the alarm indication suppression messages comprise Eth-AIS messages in accordance with ITU Y.1731.

15. A system comprising:
   at least one processor; and
   one or more non-transitory computer-readable media storing logic for execution by the at least one processor, the logic comprising:
   logic for receiving a connectivity fault management message at a first maintenance end point from a second maintenance end point, wherein the first and second maintenance end points are Service Operation, Administration, and Management ("SOAM") maintenance end points;
   logic for determining from the connectivity fault management message if the second maintenance end point is of a higher SOAM maintenance level than the first maintenance end point;
   logic for determining from the connectivity fault management message if the second maintenance end point is of a lower SOAM maintenance level than a presently stored snoop level variable, the presently stored snoop level variable indicative of a SOAM maintenance level of the lowest SOAM maintenance level maintenance end point from which the first management end point has received a previous connectivity fault management message;
   logic for, in response to determining that the second maintenance end point is of a higher SOAM maintenance level than the first maintenance end point and determining that the second maintenance end point is of a lower SOAM maintenance level than a presently stored snoop level variable:
      storing the SOAM maintenance level of the second maintenance end point as the snoop level variable; and
      storing configuration information for transmission of alarm indication suppression messages from the first maintenance end point to a destination maintenance end point of the connectivity fault management message.

16. A system according to claim 15, further comprising logic for forwarding the connectivity fault management message pursuant to routing information included within the connectivity fault management message.

17. A system according to claim 15, further comprising:
   logic for determining whether the first maintenance end point has received a previous connectivity fault management message from a maintenance end point other than the first maintenance end point that is of a higher SOAM maintenance level than the first maintenance end point; and
   logic for, in response to determining that the first maintenance end point has not received a previous connectivity fault management message from a maintenance end point other than the first maintenance end point that is of a higher SOAM maintenance level than the highest SOAM maintenance level of the first maintenance end point:
   storing the SOAM maintenance level of the second maintenance end point as the snoop level variable; and
   storing configuration information for transmission of alarm indication suppression messages from the first maintenance end point to a destination maintenance end point of the connectivity fault management message.

18. A system according to claim 15, wherein the connectivity fault management message is a continuity check message in accordance with IEEE 802.1ag.

19. A system according to claim 15, wherein each of the first maintenance end point and the second maintenance end point is a Maintenance Entity Group End Point in accordance with IEEE 802.1ag.

20. A system according to claim 15, wherein the alarm indication suppression messages comprise Eth-AIS messages in accordance with ITU Y.1731.

* * * * *